Patented Oct. 16, 1951

2,571,093

UNITED STATES PATENT OFFICE 2,571,093

COMPOSITION AND TREATMENT OF DRILLING FLUIDS

Scott E. Temple, Downey, Calif., assignor to Union Oil Company of California, Los Angeles, Calif., a corporation of California No Drawing. Application January 27, 1948, Serial No. 4,719

23 Claims. (Cl. 252—8.5)

This invention relates to fluids or muds employed in the drilling of oil, gas and other wells and to methods for drilling wells employing these fluids. More particularly, this invention relates to the prevention, treatment and correction of the deleterious effects on these fluids produced by drilling formations and other zones containing contaminating agents having the effect of increasing the viscosity and/or filtration characteristics of the drilling fluid, such as when drilling through cement plugs.

The drilling of an oil, gas or water well by means of rotary drilling tools is well known. In such cases, a hollow drill pipe or drill stem with a rotary bit attached to the lower end is rotated to drill out the borehole. Drilling mud or fluid is circulated downwardly through the hollow drill stem and bit to the bottom of the borehole and then upwardly to the surface through the annular space between the drill stem and the face of the borehole. The drilling mud in general comprises a suspension of solid material in a liquid medium such as water and may contain other added agents. The drilling mud serves to lubricate and cool the drill bit, suspend and carry cuttings out of the borehole, plaster the face of the borehole with a thin impervious layer of solid material to prevent flow of fluids into or out of the formation, apply a hydrostatic pressure to the formation to counterbalance the pressure of liquids or gases sometimes present there, and fulfill other requirements.

In order for the drilling fluid to perform the above functions it must have certain desirable physical properties. The fluid must have a viscosity of such a magnitude that it is conveniently pumpable without undue pressure differentials. It must be sufficiently thixotropic so that cuttings will remain suspended in the borehole should circulation of the mud be stopped for any reason, and in addition readily release the cuttings from suspension when the fluid is agitated as in the settling pits. It must further form a thin impervious filter cake on the borehole face to prevent the loss of the liquid medium present in the drilling mud by filtration into the formations through which the borehole passes. Such a filter cake effectively seals the face of the borehole and inhibits any tendencies toward sloughing, heaving or cave-in of the formation into the borehole. The fluid must be further capable of suspending inorganic weighting agents having high specific gravities, such as compounds of the heavy metals, so that a pressure substantially greater than the hydrostatic pressure of a column of water of equal depth may be applied when necessary to the formation. The fluid should also be of such a constitution that the presence of granular material, such as cuttings formed in drilling the borehole and which may be assimilated or dissolved by the drilling mud has substantially no effect on the physical properties of the drilling fluid.

One physical characteristic of a drilling mud which is of considerable importance is its ability to form a thin impervious cake on the walls or the face of the borehole to seal this surface against fluid flow therethrough. This property may also be termed the cake-forming, water loss, sealing, or filtration characteristic. A measure of the ability of a drilling mud to form such a thick impervious layer may be obtained by means of a simple filtration test in which the mud cake is formed and pressed against the membrane or filter which is permeable to water. A standardized procedure for determining the filtration rate is described in "Recommended Practice on Field Procedure for Testing Drilling Fluids A. P. I. Code No. 29, Second Edition" published July, 1942 beginning on page 11. The test briefly comprises measuring the total volume of filtrate water obtained during a given time interval of pressure filtration. The best procedure for determining the filtration rate is to measure the filtrate volume obtained during the first hour of the test; however, the volume of filtrate obtained during the first five minutes or the first fifteen minutes of filtration may be employed as an indication of the filtration rate. Numerous correlations of such filtration rate determination with actual drilling experience with the same drilling muds have indicated that a fluid yielding a total filtrate in excess of about 45 ml. during the first hour may be dangerous to use and that a drilling mud yielding less than about 30 ml. during the first hour under the same testing conditions is generally very satisfactory.

Another important characteristic of drilling muds is their viscosity which should be of such a magnitude that the mud may be readily and easily circulated by pumping such as is ordinarily employed during drilling operations. A standardized procedure is generally used to evaluate the property wherein a Marsh funnel viscosimeter is employed and the time required for a given volume of drilling mud to pass through the funnel is determined and taken as an indication of the viscosity or pumpability. This test is conducted by measuring 1500 ml. of drilling mud into the funnel and measuring the time required for 946 ml. (one quart) to run out and the viscosity is reported in terms of time in seconds. The standardized procedure for the determination of the Marsh viscosity, apparent viscosity, or funnel viscosity, as they may be termed, may be found in "Recommended Practice on Standard Field Procedure for Testing Drilling Fluids, A. P. I. Code No. 29, Second Edition" published July 1942, page 6.

A recent development in the art of drilling fluids has been the use of a water loss agent in conjunction with a water-soluble salt and an aqueous suspension of clay. The proven water loss agents include such materials as starch, methylated cellulose, ethyl cellulose, sodium carboxy methyl cellulose, alginates, Irish moss, quebracho, gums, and the like which perform the function of decreasing the amount of water lost from the drilling fluid to the surrounding formations. A germicide such as paraformaldehyde, chlorinated phenols, and the like is generally added to inhibit the fermentation of the water loss agent wherever this is required.

The use of a water-soluble salt such as calcium chloride, magnesium chloride, sodium chloride, and the like in these fluids tends to flocculate the formations which contact the fluid and reduces the hydration and swelling of certain easily hydratable clays. These properties facilitate the drilling of formations such as heaving shales which hydrate and swell to such an extent that the well bore becomes plugged and/or displaced with the result that further drilling becomes impossible. Contamination of these fluids with salt or gypsum during drilling operations has little or no effect on their physical properties. Moreover, flocculation of the producing formations during drilling increases their permeability in the vicinity of the well bore, thereby increasing the potential oil production of the well.

During the drilling of a well cementing operations are standard procedures for many purposes and the placement of the cement leaves a residual plug in the bottom of the well bore which is then removed when the drilling is resumed. As a result of this cement contamination, the viscosity of the mud rapidly increases to a point where the mud fails to perform its normal functions as outlined above. In severe cases the mud eventually becomes unpumpable, the cuttings fail to settle from the mud in the usual way, no filter cake is formed on the wall of the well bore, and the mud must then be discarded.

Calcium hydroxide is leached from the cement by the mud during the drilling of a cement plug and is dissolved in the aqueous phase of the drilling mud. The generally accepted method for handling cement-contaminated muds has been to treat the mud with sodium bicarbonate which precipitates the calcium as a carbonate or bicarbonate. In those cases where the drilling mud contains a water-soluble salt which can form a precipitate with sodium bicarbonate, this method of treatment is somewhat limited unless conditions can be controlled to avoid such precipitation.

In the past it has been quite a problem to drill a well through a number of widely different formations and also through one or more cement plugs. Often two or more different types of mud have been used to complete a single well. Alternately, a single mud has been employed and the contaminated mud has been replaced with fresh mud as often as was necessary to continue the drilling. There is therefore a distinct need for a single all-purpose drilling fluid which is immune to the effects of cement contamination, which does not hydrate and swell formations such as heaving shale, which is not adversely affected by contamination with salt and/or gypsum, which increases the permeability of the oil bearing formations, and which has suitable physical characteristics for general drilling operations.

A primary object of this invention is to provide a general all-purpose drilling fluid which is suitable for the drilling of oil, gas and water wells through a wide variety of formations and which is at the same time immune to cement contamination.

Another object of this invention is to prevent, treat and/or correct the deleterious effects of cement contamination on the physical and chemical characteristics of a drilling fluid and in such a manner that the resultant treated fluid can be used in general drilling operations without any limitations arising therefrom.

Another object of this invention is to treat a drilling fluid, which is to be, or is being circulated during the drilling of a well bore containing a cement plug, with an acid reacting agent, prior to the drilling of the cement plug such that the calcium hydroxide which is leached from the cuttings by the fluid is continuously neutralized, thereby immunizing the mud against the effects of cement contamination.

Another object of this invention is to simultaneously treat a drilling fluid during the drilling of a cement plug such that the thickening normally arising from cement contamination is circumvented.

Another object of this invention is to treat a drilling fluid containing an aqueous suspension of clay, a water-soluble salt of ammonia or a metal above iron in the electromotive series, and a water loss agent, either prior to, during or following cement contamination such that the thickening of the drilling fluid is prevented and/or corrected.

Another object of this invention is to provide a means for reclaiming drilling fluids which have been excessively thickened as a result of cement contamination.

Other objects of this invention will become apparent to those skilled in the art as the description thereof proceeds.

Briefly, this invention relates to the preparation, treatment and use of drilling fluids which are immune to the deleterious thickening effects of cement contamination, and to a method of reclaiming drilling fluids which have become thickened as a result of cement contamination. In the case of those muds comprising an aqueous suspension of clay, a water loss agent and a water-soluble salt, the principal effects of cement contamination arise from an increase in the pH of the mud caused by the solution of the calcium hydroxide leached from the cement.

In the case of drilling fluids comprising a water loss agent, a water-soluble salt of ammonia or a metal above iron in the electromotive series, and an aqueous suspension of clay it has been found that the general effects of cement contamination can be overcome by the addition of any of the acid reacting agents, as hereinafter described, to the cement-contaminated drilling fluid in an amount sufficient to restore the pH to the range of 5 to 9 and preferably to the range of 6.5 to 8. Moreover, it has been found that, if the acid reacting agent is added to the fluid prior to the time that the contamination is expected to occur as determined from the location of the plug, and in an amount necessary to bring the final pH of the fluid to the range of 5 to 9 and preferably to the range of 6.5 to 8 as estimated from the quantity of cement to be drilled out, then the fluid is immunized against the effects of the cement contamination and the desirable physical properties of the original fluid can be maintained throughout the entire course of the contamination.

In the field a continuous method for treating a drilling fluid is generally preferred since the reagents can most easily be added in small amounts to the circulating drilling fluid. The invention, herein described, meets this requirement and it has been found that the fluid can be treated by the addition of an acid reacting agent to the circulating fluid either prior to the actual cement contamination or during the cement drilling or combinations thereof. The fluid can often be circulated and treated after the cement contamination, but it is almost always preferable to treat the fluid prior to this stage.

For purposes of this invention an acid reacting agent is any chemical compound whose 1/10 molar aqueous solution has a pH of not more than 5 at 25° C. including those inorganic and organic acids, acid salts and salts of strong acids and weak bases which meet the requirement. Among the acid reacting agents which may be used in this invention are hydrochloric acid, hydrobromic acid, sulfuric acid, nitric acid, sulfamic acid, phosphoric acid, hydrofluoric acid, hydrogen sulfide, sulfurous acid, acetic acid, citric acid, formic acid, oxalic acid, sodium bisulfate, ammonium bisulfate, ammonium chloride and the like. However, it is preferable to use those acid reacting agents whose 1/10 molar aqueous solution has a pH of not more than 3.5 at 25° C., such as hydrochloric acid, hydrobromic acid, sulfuric acid, nitric acid, sulfamic acid, phosphoric acid, acetic acid, citric acid, formic acid, oxalic aid, sodium bisulfate, ammonium bisulfate, and the like. It is further preferable to employ only strong inorganic acids whose 1/10 molar aqueous solution has a pH of not more than 3.5 at 25° C. This latter grouping includes hydrochloric acid, hydrobromic acid, sulfuric acid, nitric acid, sulfamic acid, phosphoric acid, and the like.

It has been found to be both desirable and preferable to use only those acid reacting agents which do not form precipitates with the water-soluble salt component of the drilling fluid being treated. Thus, a drilling fluid which contains principally sodium chloride as the water-soluble salt in conjunction with any of the hereinafter described water loss agents is in general compatible with any acid whose sodium salt is water-soluble. This fluid could be treated with any of the following acids: hydrochloric acid, hydrobromic acid, sulfuric acid, nitric acid, sulfamic acid, phosphoric acid, and the like.

A drilling fluid containing principally calcium chloride as the water-soluble salt in conjunction with a suitable water loss agent could be treated with any of the following acids, all of whose calcium salts are soluble in water in an amount greater than 5 grams per 100 grams of water at 25° C.: hydrochloric acid, hydrobromic acid, nitric acid, sulfamic acid and the like. Both phosphoric and sulfuric acids are not preferred for use with the calcium chloride containing drilling fluid since either acid tends to precipitate insoluble calcium salts by reaction with the calcium chloride, and especially so in those cases where the acid is present in excess of that required to neutralize the calcium hydroxide leached from the cement. Although either acid could be used under carefully controlled conditions, it is preferable to choose an acid which when present in slight excess does not precipitate any of the components of the drilling fluid and alter its basic composition.

It is apparent that this invention comprises a method for immunizing a drilling fluid against the effects of cement contamination and/or a method for treating a cement-contaminated drilling fluid to correct the effects of cement contamination. The invention also embraces a method of preparation of a new all-purpose type of drilling fluid which is suitable for both general drilling operations and for the drilling of cement plugs.

A drilling fluid, comprising an aqueous suspension of clay, about 12 pounds of gelatinized starch per barrel, about 5 pounds of calcium chloride per barrel and 0.35 pound per barrel of paraformaldehyde, a germicide which inhibits starch fermentation, is a very satisfactory drilling fluid for general drilling operations including the drilling of salt beds, gypsum, and heaving shales. This fluid is thickened as a result of cement contamination and this effect is readily circumvented and/or corrected by any of the methods of treatment disclosed herein. When this mud has been immunized against cement contamination by the addition of a limited amount of an acid reacting agent such as hydrochloric acid, it loses none of its desirable physical or chemical characteristics. Thus, it is possible to prepare an all-purpose drilling fluid by immunizing a selected drilling fluid against cement contamination by the addition of an acid reacting agent. The immunization is limited in nature by the reserve of acid reacting agent present in the mud which can combine with the calcium hydroxide. However, the immunization can be replenished and renewed by the addition of more acid reacting agent and can thus be perpetuated as required during the drilling life of the mud.

This method of immunization is operable with all drilling fluids comprising a water-soluble salt of ammonia or a metal above iron in the electromotive series, a water loss agent, and an aqueous suspension of clay and with any of the acid reacting agents within the general limitations and preferences herein described. The water-soluble salt component in the drilling fluid can be any water-soluble salt of a metal above iron in the electromotive series or ammonia, which is compatible with the remaining constituents of the mud. These include such salts as sodium chloride, sodium nitrate, sodium sulfate, sodium acetate, potassium chloride, potassium nitrate, potassium sulfate, potassium acetate, calcium chloride, calcium nitrate, calcium acetate, magnesium chloride, magnesium nitrate, magnesium sulfate, magnesium acetate, zinc chloride, zinc nitrate, zinc sulfate, aluminum chloride, aluminum nitrate and aluminum sulfate. The term water loss agents comprises such materials as gelatinized starch, methylated cellulose, ethylated cellulose, sodium carboxy methyl cellulose, Irish moss, alginates, gum of tragacanth and the like.

In general, a drilling fluid which is immune to cement contamination is prepared by dissolving a water-soluble salt of the aforementioned class in water, adding thereto sufficient clay such that the weight of the final drilling fluid is in the range of 67 to 85 pounds per cubic foot, dispersing therein a water loss agent of the aforementioned type and adding thereto a suitable acid reacting agent to immunize the finished mud. Heavier muds are usually prepared by the addition of weighting agents. The order of mixing is usually not critical and can be varied to suit the particular case. The drilling fluid of this invention should preferably contain about 0.4 to 4.0% by weight of a water loss agent, about 0.4 to 4.0% by weight of a water-soluble salt, about 1% by weight of 20° Baumé hydrochloric acid or its equivalent, sufficient clay to weight the final mud to the range of about 67 to 85 pounds per cubic foot which is generally in the range of about 12% by weight or more, and water. When an acid reacting agent other than hydrochloric acid is employed, an amount is added which has approximately the same equivalency for neutralizing calcium hydroxide as has the 1% by weight of 20° Baumé hydrochloric acid. These muds are immune to cement contamination to the extent of about 6 pounds per barrel of mud and this is ample for the removal of most cement plugs. Larger amounts of acid can be added to increase the limit of immunization, but it is generally desirable to control the pH at about 6.0 or higher because of the increased corrosion of equipment in contact with solutions of lower pH. It is, therefore, preferable to add the acid in smaller amounts and as required. However, acid reacting agent equivalent to about 0.5 to 7.0% by weight of 20° Baumé hydrochloric acid may be used if desired.

Perhaps the advantages of the present invention can best be illustrated by reference to the following specific examples:

Example I

A sample of a typical lot of used drilling fluid was obtained for use in the following experiments. The sample contained 12.5 pounds of gelatinized starch, 6.2 pounds of calcium chloride, 50 pounds of clay, 0.35 pound of paraformaldehyde and 39 gallons of water on a per barrel basis.

An aliquot of the drilling fluid was mixed with 6 pounds of commercial Portland cement per barrel of fluid to show quantitatively the effect of cement contamination. Another aliquot of the fluid was contaminated with the same relative amount of cement with the exception that the fluid was continuously treated with 20° Baumé hydrochloric acid during the addition of the cement to maintain the pH at about 7.0 throughout the addition. About 0.083 gallon of acid per pound of cement was required in this case.

The following test data compare the original sample of used fluid with the cement-contaminated drilling fluid and with the acid treated and cement-contaminated fluid:

|  | Original Sample | Cement-Contaminated Sample | Acid Treated Cement-Contaminated Sample |
| --- | --- | --- | --- |
| Weight, lbs./cu. ft | 71.5 | 73.0 | 73.0 |
| Viscosity, Marsh Test, seconds | 37.0 | 44.4 | 36.4 |
| Water Loss, cc./15 min. | 2.9 | 8.5 | 3.2 |
| Cake Thickness, in | 1/64 | 9/32 | 1/64 |
| Calcium Chloride, lbs./bbl | 6.2 | 6.25 | 7.7 |
| pH | 7.0 | 11.0 | 7.0 |

A comparison of the data for the cement-contaminated fluid and original samples clearly shows the increased water loss, increased viscosity, and increased cake thickness resulting from the cement contamination. Examination of the data for the acid treated and cement-contaminated samples shows that the effect of cementing contamination can be completely eliminated by maintaining the pH of the mud at about 7.0 during the contamination. In practice the small amount of calcium chloride formed during the neutralization of the calcium hydroxide serves to decrease the amount of make-up calcium chloride necessary to replace that lost to the formation during the normal usage of the drilling fluid.

In another experiment the hydrochloric acid (0.083 gallon per pound of cement) was added to the drilling fluid prior to the addition of the cement (6 pounds per barrel of mud). Substantially the same data were obtained for this sample as were obtained for the case where the acid and cement were added simultaneously. In still another experiment the fluid was first contaminated with the cement (6 pounds per barrel of fluid) and then treated with sufficient acid to bring the pH to 7.0. The thickening effect of the cement contamination was decreased by the addition of the acid.

In the latter case the acid did not blend into the cement-contaminated fluid as easily as it did in either of the other experiments. For this reason it is generally preferable to acid treat the mud before it has been contaminated.

Example II

A typical calcium chloride gelatinized starch type drilling fluid is prepared by dissolving 364 pounds of calcium chloride in about 48.5 barrels of water (42 gallons per barrel), slurrying about 2600 pounds of drilling mud clay (such as is mined in the Antelope Valley region of California) with the brine, dispersing therein about 635 pounds of gelatinized starch, and finally adding about 38 pounds of a paraformaldehyde-containing germicide to inhibit the fermentation of the starch.

An oil well was drilled in the Dominguez field of southern California, using a conventional water-base clay mud, to a depth of about 7500 feet after which a calcium chloride-starch containing mud was used to complete the well to a total of 11,884 feet. At about 9,975 feet the well was cemented in and the cement was allowed to set up for four days. It was then necessary to remove an estimated 2900 pounds of cement from the 78 feet of plug left in the bore after the cementing. Prior to the drilling of the plug about 686 barrels of calcium chloride-starch drilling mud was being circulated throughout the system and a period of about 55 minutes was required to complete the circulation cycle.

Roughly 30 minutes after the drilling of the cement plug began, the acid treatment of the mud was started by pumping equal volumes of water and 20° Baumé hydrochloric acid into the mud stream at a rate sufficient to maintain the pH of the treated mud in the range of 7.0 to 9.0. The drilling of the cement was completed during about 6 hours and 140 gallons of 20° Baumé hydrochloric acid were required corresponding to an acid consumption of 0.049 gallon per pound of cement removed by drilling.

The following data compare the drilling fluid before and after the cement drilling showing that there is no appreciable degradation of the mud as a result of the cement drilling when the alkalinity of the mud is continuously neutralized with an acid, such as hydrochloric acid:

|  | Original Mud | Treated and Cement-Contaminated Mud |
| --- | --- | --- |
| Weight, lbs./cu. ft | 74.5 | 71.5 |
| Viscosity, Marsh Test, sec | 40.0 | 40.6 |
| Water Loss, cc./15 min | 3.8 | 3.5 |
| Cake Thickness, inches | 1/64 | 3/64 |
| Calcium Chloride, lbs./bbl | 7.1 | 8.2 |
| Sand Content, volume by per cent | 5.0 | 3.0 |
| pH | 6.8 | 8.0 |

The variation between the laboratory and field tests in the acid consumed per pound of cement is attributed to the fact that an appreciable fraction of the cement cuttings are often removed in actual field operations before the leaching of the cement by the mud is complete. The leaching of the cement cuttings varies with the length of time that the cement has been allowed to set up as well as how rapidly and efficiently the cuttings are removed from the circulating mud.

Example III

When a sample of used calcium chloride-starch type mud is contaminated with 6 pounds of cement per barrel of mud and simultaneously neutralized to a pH of 7 with nitric acid containing about 30% of HNO₃ by weight, the effect of the cement contamination is eliminated in much the same manner as when hydrochloric acid was used in Example I.

Example IV

When a used calcium chloride-starch mud is contaminated with 6 pounds of cement per barrel of mud and simultaneously neutralized in part to a pH of about 8.5 with acetic acid containing about 50% of the anhydrous acid by weight, the physical structure of the mud is not deteriorated as a result of the cement contamination.

Example V

A sodium chloride-starch drilling fluid is prepared by mixing Santa Maria Valley clay with water in an amount sufficient to give a mud weight of 72 pounds per cubic foot. About 6% by weight of sodium chloride is mixed with the slurry until dissolved and about 1% by weight of gelatinized starch is dispersed therein. When the mud is continuously neutralized to a pH of 7.0 with diluted aqueous sulfuric acid containing about 20% by weight of the anhydrous acid during the addition of 6 pounds of cement per barrel of drilling fluid, the normal thickening produced by cement contamination is not observed in the subsequent physical testing. In the absence of the acid the addition of cement thickens this mud and increases its water loss.

Example VI

When the experiment described in Example V is repeated, and a solution of ammonium chloride containing 15% by weight of NH₄Cl is used in place of the sulfuric acid to maintain the pH at about 9 (instead of 7) during the addition of the cement, the normal increase in viscosity and water loss as a result of cement contamination is lessened.

Example VII

A sodium chloride-methyl cellulose containing drilling fluid is prepared by mixing Santa Maria Valley mud with water in suitable proportions to give a mud weight of 72 pounds per cubic foot. Approximately 4% by weight of sodium chloride is mixed with the slurry until dissolved and about 1% by weight of methyl cellulose is subsequently dispersed therein. When about 6 pounds of cement per barrel of mud is added to the mud, it is noticeably thickened as determined by the physical tests. When about 0.08 gallon of 20° Baumé hydrochloric acid per pound of cement is added concurrently with the cement, this thickening is not observed.

Example VIII

When about 1% sodium carboxy methyl cellulose is substituted for the 1% methyl cellulose in Example VII, substantially the same results were obtained and the mud was not appreciably thickened by the contamination.

Example IX

When about 1% zinc chloride is substituted for the sodium chloride in Example VII the results are substantially the same as described therein.

Example X

When about 0.5% aluminum chloride is substituted for the sodium chloride in Example VII the results are substantially the same as described therein.

From these examples it is apparent that my invention is broadly applicable to a number of different combinations of drilling fluids and acidic treating agents. The general qualifications of the treating process relate to a drilling fluid containing a water-soluble salt of ammonia or a metal above iron in the electromotive series, and a water loss agent in conjunction with an aqueous suspension of clay and an acid reacting agent which does not precipitate the principal water-soluble salt component of the drilling fluid, but will at least partially neutralize calcium hydroxide in the presence of the drilling fluid. It is further apparent that the treating may be carried out at any time before, during, or after the cement drilling, and that it is preferable to conduct the treatment prior to any appreciable thickening of the fluid as a result of the cement contamination. It is further evident that any drilling fluid of the cited class can be immunized against cement contamination by treatment with a suitable acid reacting agent in an amount sufficient to neutralize at least a part of the calcium hydroxide which is expected to be leached out of the cement and cement cuttings which will contact the mud.

Having described and illustrated my invention and realizing that many modifications may occur to those skilled in the art without departing from the spirit and scope of my invention, I claim the following:

1. A drilling fluid comprising an aqueous suspension of clay, a small amount greater than about 0.4% by weight, a water loss agent selected from the class consisting of gelatinized starch, methylated cellulose, ethylated cellulose, sodium carboxy methyl cellulose, Irish moss, alginates and gum of tragacanth, a water-soluble salt of a metal above iron in the electromotive series, and an acid reacting agent wherein said acid reacting agent is selected from the class consisting of acid reacting agents which do not cause precipitation of calcium ion and wherein said acid reacting agent is present in an amount sufficient to reduce the pH of the drilling fluid to 6.5 to 8.0.

2. A drilling fluid according to claim 1 wherein the acid reacting agent is a strong inorganic acid whose calcium salt is soluble in water in an amount greater than 5 g. per 100 g. of water at 25° C.

3. A drilling fluid according to claim 1 wherein the acid reacting agent is hydrochloric acid.

4. A drilling fluid according to claim 1 wherein the acid reacting agent is acetic acid.

5. A drilling fluid according to claim 1 wherein the acid reacting agent is sulfuric acid and the water-soluble salt is one which is not precipitated by sulfuric acid.

6. A drilling fluid comprising an aqueous suspension of clay, a small amount greater than about 0.4% by weight, a water loss agent selected from the class consisting of gelatinized starch, methylated cellulose, ethylated cellulose, sodium carboxy methyl cellulose, Irish moss, alginates and gum of tragacanth, a small amount greater than about 0.4% by weight of calcium chloride, and hydrochloric acid in an amount sufficient to immunize against cement contamination.

7. A drilling fluid according to claim 6 wherein the water loss agent is gelatinized starch.

8. A drilling fluid, which is immune to cement contamination, which comprises about 0.4 to 4.0% by weight of a water-soluble salt of a metal above iron in the electromotive series, about 0.4 to 4.0% by weight of a water loss agent selected from the class consisting of gelatinized starch, methylated cellulose, ethylated cellulose, sodium carboxy methyl cellulose, Irish moss, alginates and gum of tragacanth, a strong inorganic acid whose calcium salt is soluble in water in an amount greater than 5 g. per 100 g. of water at 25° C. in an amount equivalent to about 0.5 to 7.0% by weight of 20° Baumé hydrochloric acid for neutralizing calcium hydroxide, about 12% by weight clay to weight the final drilling mud to the range of 67 to 85 pounds per cubic foot, and water.

9. A drilling fluid, which is immune to cement contamination, which comprises about 0.4 to 4.0% by weight of a water-soluble salt above iron in the electromotive series, about 0.4 to 4.0% by weight of a water loss agent selected from the class consisting of gelatinized starch, methylated cellulose, ethylated cellulose, sodium carboxy methyl cellulose, Irish moss, alginates and gum of tragacanth, hydrochloric acid in an amount equivalent to about 0.5 to 7.0% by weight of 20° Baumé hydrochloric acid, about 12% by weight clay to weight the final drilling mud to the range of 67 to 85 pounds per cubic foot, and water.

10. A drilling fluid which is immune to cement contamination which comprises about 0.4 to 4.0% by weight of a water-soluble salt of a metal in the alkali and alkaline earth groups, about 0.4 to 4.0% by weight of a water loss agent selected from the class consisting of gelatinized starch, methylated cellulose, ethylated cellulose, sodium carboxy methyl cellulose, Irish moss, alginates and gum of tragacanth, an inorganic acid whose calcium salt is soluble in water in an amount greater than 5 g. per 100 g. of water at 25° C. in an amount equivalent to about 0.5 to 7.0% by weight of 20° Baumé hydrochloric acid for neutralizing calcium hydroxide, about 12% by weight clay to weight the final drilling mud to the range of 67 to 85 pounds per cubic foot, and water.

11. A method for drilling through a cement plug within a well bore, which comprises adding an acid reacting agent wherein said acid reacting agent is selected from the class consisting of acid reacting agents which do not cause precipitation of calcium ion to the drilling fluid prior to the drilling of cement in an amount sufficient to immunize said drilling fluid against the undue thickening as a result of the cement contamination, and wherein the drilling fluid comprises an aqueous suspension of clay, a small amount greater than about 0.4% by weight of a water loss agent selected from the class consisting of gelatinized starch, methylated cellulose, ethylated cellulose, sodium carboxy methyl cellulose, Irish moss, alginates and gum of tragacanth, and a small amount greater than about 0.4% by weight of a water-soluble salt of a metal above iron in the electromotive series, and subsequently drilling the cement plug.

12. A method according to claim 11 wherein the acid reacting agent is a strong inorganic acid whose calcium salt is soluble in water in an amount greater than 5 g. per 100 g. of water at 25° C.

13. A method according to claim 11 wherein the acid reacting agent is hydrochloric acid.

14. A method for drilling through a cement plug in a well bore, which comprises adding an acid reacting agent to the drilling fluid during the drilling of the cement plug in an amount sufficient to eliminate the deleterious effects of cement contamination on the drilling fluid wherein said acid reacting agent is selected from the class consisting of acid reacting agents which do not cause precipitation of calcium ion, and which drilling fluid comprises an aqueous suspension of clay, a small amount greater than about 0.4% by weight of a water loss agent selected from the class consisting of gelatinized starch, methylated cellulose, ethylated cellulose, sodium carboxy methyl cellulose, Irish moss, alginates and gum of tragacanth, and a small amount greater than about 0.4% by weight of a water-soluble salt of a metal above iron in the electromotive series.

15. A method according to claim 14 wherein the acid reacting agent is a strong inorganic acid whose calcium salt is soluble in water in an amount greater than 5 g. per 100 g. of water at 25° C.

16. A method according to claim 14 wherein the acid reacting agent is hydrochloric acid.

17. A process for reclaiming a cement contaminated drilling fluid, which drilling fluid comprises an aqueous suspension of clay, a small amount greater than about 0.4% by weight of a water loss agent selected from the class consisting of gelatinized starch, methylated cellulose, ethylated cellulose, sodium carboxy methyl cellulose, Irish moss, alginates and gum of tragacanth, and a small amount greater than about 0.4% by weight of a water-soluble salt, which process comprises adding an acid reacting agent to the cement-contaminated mud and in an amount sufficient to neutralize at least partially the calcium hydroxide suspended and dissolved in the mud as a result of cement contamination, thereby restoring the mud to a physical state similar to that possessed by the mud prior to said cement contamination wherein said acid reacting agent is selected from the class consisting of acid reacting agents which do not cause precipitation of calcium ion.

18. A process according to claim 17 wherein the acid reacting agent is a strong inorganic acid whose calcium salt is soluble in water in an amount greater than 5 g. per 100 g. of water at 25° C.

19. A process according to claim 17 wherein the acid reacting agent is hydrochloric acid.

20. A drilling fluid comprising an aqueous suspension of clay, a small amount greater than about 0.4% by weight of a water loss agent selected from the class consisting of gelatinized starch, methylated cellulose, ethylated cellulose, sodium carboxy methyl cellulose, Irish moss, alginates and gum of tragacanth, a small amount greater than about 0.4% by weight of a water-soluble salt of a metal above iron in the electromotive series, and an acid reacting agent in an amount sufficient to immunize against cement contamination, the anion of said acid reacting agent having the property of forming a soluble salt with the cation of said water-soluble salt wherein said acid reacting agent is selected from the class consisting of acid reacting agents which do not cause precipitation of calcium ion.

21. A drilling fluid comprising an aqueous suspension of clay, a small amount greater than about 0.4% by weight of a water loss agent selected from the class consisting of gelatinized starch, methylated cellulose, ethylated cellulose, sodium carboxy methyl cellulose, Irish moss, alginates and gum of tragacanth, a small amount greater than about 0.4% by weight of a water-soluble salt of calcium, and an acid reacting agent in an amount sufficient to immunize against cement contamination, the anion of said acid reacting agent having the property of forming a soluble salt with calcium ion.

22. In a method for drilling a well bore through an oil-bearing formation with a drilling fluid comprising an aqueous suspension of clay, a small amount greater than about 0.4% by weight of a water loss agent selected from the class consisting of gelatinized starch, methylated cellulose, ethylated cellulose, sodium carboxy methyl cellulose, Irish moss, alginates and gum of tragacanth, and a small amount greater than about 0.4% by weight of a water-soluble salt of a metal above iron in the electromotive series, the improvement which comprises adding an amount of an acid reacting agent to said drilling fluid which is sufficient to bring the pH of said drilling fluid to between about 6.5 and 8.0 and drilling through said oil-bearing formation wherein said acid reacting agent is selected from the class consisting of acid reacting agents which do not cause precipitation of calcium ion.

23. In a method according to claim 22 wherein the pH of said drilling fluid is maintained between about 6.5 and 8.0 during said drilling by the addition of further amounts of acid reacting agent.

SCOTT E. TEMPLE.

REFERENCES CITED

The following references are of record in the file of this patent:

UNITED STATES PATENTS

| Number | Name | Date |
|---|---|---|
| 2,304,256 | Huebel | Dec. 8, 1942 |
| 2,343,113 | Jones | Feb. 29, 1944 |
| 2,371,955 | Dawson et al. | Mar. 20, 1945 |
| 2,393,273 | Wayne | Jan. 22, 1946 |
| 2,399,986 | Chapman | May 7, 1946 |
| 2,425,768 | Wagner | Aug. 19, 1947 |
| 2,433,668 | Jones | Dec. 30, 1947 |

OTHER REFERENCES

Article in "Petroleum" (German publication), issue No. 44, Nov. 2, 1932, pages 7 and 8.

"Reducing the Viscosity of Mud Flush," article in The Petroleum Times, Mar. 3, 1934, page 225.

The pH of a Drilling Mud, article in the Oil Weekly, Nov. 1, 1937, pages 30 and 34.

Chaney, A Review of Recent Advances in Drilling Mud Control, article in the Oil Weekly, Nov. 23, 1942, pgs. 25, 26, 28, 32, 34, 36, 38, 40 and 42.